(12) United States Patent
Johansen et al.

(10) Patent No.: US 12,078,127 B2
(45) Date of Patent: Sep. 3, 2024

(54) MULTI-MODE PROPULSION SYSTEM

(71) Applicant: ATLANTIS RESEARCH LABS INC., Medicine Hat (CA)

(72) Inventors: Craig Johansen, Calgary (CA); William Schuyler Hinman, Calgary (CA); Vladimir Mravcak, Medicine Hat (CA)

(73) Assignee: Atlantis Research Labs Inc. (CA)

( * ) Notice: Subject to any disclaimer, the term of this patent is extended or adjusted under 35 U.S.C. 154(b) by 0 days.

(21) Appl. No.: 17/923,418

(22) PCT Filed: May 5, 2021

(86) PCT No.: PCT/CA2021/050632
§ 371 (c)(1),
(2) Date: Nov. 4, 2022

(87) PCT Pub. No.: WO2021/223028
PCT Pub. Date: Nov. 11, 2021

(65) Prior Publication Data
US 2023/0193856 A1 Jun. 22, 2023

Related U.S. Application Data

(60) Provisional application No. 63/020,327, filed on May 5, 2020.

(51) Int. Cl.
*F02K 7/18* (2006.01)
*F02C 7/042* (2006.01)
(Continued)

(52) U.S. Cl.
CPC ............... *F02K 7/18* (2013.01); *F02C 7/042* (2013.01); *F02C 7/10* (2013.01); *F02C 7/224* (2013.01);
(Continued)

(58) Field of Classification Search
CPC ... F02K 3/08; F02K 3/10; F02K 3/105; F02K 3/11; F02K 1/80; F02K 9/08; F02K 9/72; F02C 7/057
See application file for complete search history.

(56) References Cited

U.S. PATENT DOCUMENTS 2,883,829 A   4/1959 Fricano
3,802,192 A * 4/1974 Curran ...................... F02K 7/18
                                                            60/245
(Continued)

FOREIGN PATENT DOCUMENTS

EP        0 362 053        4/1990

OTHER PUBLICATIONS

International Search Report and Written Opinion corresponding to International Patent Application No. PCT/CA2021/050632, mailed Aug. 5, 2021.

*Primary Examiner* — William H Rodriguez
(74) *Attorney, Agent, or Firm* — McAndrews, Held & Malloy, Ltd.

(57) ABSTRACT

The present invention provides a multimode propulsion system, comprising at least one propellant ejector system, a high speed fluid ejection nozzle coupled to a propellant supply provided in the engine, and a propellant-air mixing system comprising at least one fluid intake member having an inlet end and an outlet end, the inlet end being in fluidic communication with the fluid ejection nozzle to receive the propellant ejected from the nozzle.

20 Claims, 9 Drawing Sheets

(51) Int. Cl.
   *F02C 7/10*     (2006.01)
   *F02C 7/224*    (2006.01)
   *F02K 7/10*     (2006.01)
   *F02K 9/08*     (2006.01)
   *F02K 9/72*     (2006.01)

(52) U.S. Cl.
   CPC ................ *F02K 7/105* (2013.01); *F02K 9/08* (2013.01); *F02K 9/72* (2013.01)

(56) References Cited

U.S. PATENT DOCUMENTS

| | | | | |
|---|---|---|---|---|
| 3,803,837 | A * | 4/1974 | Curran | F02K 7/18 |
| | | | | 60/245 |
| 3,807,169 | A * | 4/1974 | Bradford | F02K 7/18 |
| | | | | 60/39.47 |
| 3,844,118 | A * | 10/1974 | Wilkinson | F02K 7/105 |
| | | | | 60/761 |
| 4,064,692 | A * | 12/1977 | Johnson | F02K 3/077 |
| | | | | 60/762 |
| 4,461,146 | A * | 7/1984 | DuBell | F02K 3/10 |
| | | | | 60/762 |
| 4,628,688 | A * | 12/1986 | Keirsey | F02K 9/26 |
| | | | | 60/249 |
| 4,651,523 | A | 3/1987 | Adams | |
| 5,694,767 | A * | 12/1997 | Vdoviak | F02K 3/10 |
| | | | | 60/226.3 |
| 6,370,861 | B1 * | 4/2002 | Box | F02K 9/08 |
| | | | | 60/789 |
| 11,549,465 | B1 * | 1/2023 | Balepin | F02K 7/18 |
| 2004/0050062 | A1 | 3/2004 | Carton | |
| 2009/0205311 | A1 | 8/2009 | Bulman et al. | |

\* cited by examiner

MULTI-MODE PROPULSION SYSTEM

CROSS-REFERENCE TO RELATED APPLICATIONS

This application is a national stage filing of PCT/CA2021/050632, filed May 5, 2021, which claims the benefit of the filing date of U.S. Provisional Patent Application No. 63/020,327, filed May 5, 2020. The entire disclosures of the aforesaid applications are incorporated herein by reference.

FIELD OF THE INVENTION

The present invention pertains to the field of propulsion systems. More particularly, the invention relates to a multi-mode propulsion system for vehicles for achieving multiple propulsion modes, such as rocket mode, ramjet mode and hybrid rocket-ramjet mode.

BACKGROUND OF THE INVENTION

There are three primary types of "conventional" aerospace propulsion engines for high-speed flight that have reached commercial maturity: turbojet/fan engines, ramjet engines, and rocket engines.

Rocket engines benefit from their simplicity and robustness as they can operate in almost any scenario with high reliability. However, they are extremely inefficient, making long-range missions and access to space very expensive.

Turbojet/fan engines provide the best possible fuel efficiency and performance in typical flight ranges. However, they are limited to low altitudes where the air is sufficiently dense. As well, turbojets are limited to low speeds. At very high speeds the performance of turbojet engines is greatly reduced. At high speeds, limits of thermodynamic efficiency and material strength limits are reached due to the high temperatures. Finally, turbojet/fan engines are exceedingly complex due to many moving parts, numerous failure modes, and are extremely expensive.

Ramjet engines address the limitations of turbojet engines by utilizing the forward velocity of the vehicle itself to compress the oncoming air. This provides very good performance at extremely high speeds. Additionally, these engines are very simple with very few moving parts. However, ramjets cannot operate at extremely high altitudes and cannot produce thrust when the vehicle is at rest.

Many variable cycle systems based on turbojet/fans, ram/scramjets, and rockets have been proposed in the aerospace propulsion field.

Variable cycle engines that transition from a rocket propulsion system at launch, and relatively low speeds to a ramjet propulsion system at higher speeds are known from U.S. Pat. Nos. 4,651,523 and 5,224,344. U.S. Pat. No. 4,651,523 discloses a dual cycle engine having a solid propellant with an aft end shaped to form a nozzle. As the propellant burns, the missile is propelled by rocket thrust. Burning of the propellant allows forwardly positioned air covers to slide rearward enabling compressed air to be delivered to a combustion chamber initiating ramjet operation. U.S. Pat. No. 5,224,344 discloses a rocket chamber replacing the ramjet pilot of a Dual Combustion Ramjet (DCR) engine, wherein a mixture of liquid fuel and oxidizer combusted within the rocket engine initially propels the missile by rocket propulsion. As the speed increases, compressed air is delivered to the ramjet combustor through inlet passages and additional fuel is provided to the rocket engine delivering a fuel-rich exhaust to the combustor, and combustion of the fuel-rich exhaust heats and expands the compressed air enabling ramjet operation.

EP 2084386 discloses a combined cycle missile propulsion system, which includes a solid fuel contained within a first section of the missile, and a liquid oxidizer contained within a second section of the missile. A first conduit has a first valve communicating the fuel and the oxidizer, and a second conduit, spatially removed from the first conduit, has a second valve communicating the fuel and the oxidizer. An inlet system delivers atmospheric oxygen for combustion with the fuel rich gases generated within the missile. A nozzle exhausts combustion products that result from combustion of the fuel, the liquid and solid oxidizers, and air.

U.S. Pat. No. 6,857,261 discloses a multimode pulse detonation propulsion system, which can achieve an ejector-augmented pulsed detonation rocket propulsion mode, a pulsed normal detonation wave engine mode, a steady oblique detonation wave engine mode, and a pure pulsed detonation rocket mode.

Previous known systems have limitations, as they generally use combustion products of one propulsion system to entrain air and augment the thrust. Typically, the exhaust from a primary engine entrains atmospheric air into the secondary engine. Mixing of air and the fuel-rich exhaust allows for additional combustion in the secondary engine, which is subsequently accelerated through a nozzle to produce thrust. These systems have limited capacity for generating thrust at low speed.

Some of the previously known systems use fuel ejection at pulsatile/acoustic injection frequency to achieve thrust at low speed.

Therefore there is a need for an improved multi-mode propulsion system, which can easily switch between air-breathing and rocket modes with a continuous operational state between different modes, and can operate over a wide range of Mach numbers and altitudes associated with conventional rockets operating in rocket mode.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a multi-mode propulsion system for.

In accordance with an aspect of the present invention, there is provided a multimode propulsion system for, which comprises;
   at least one propellant ejector system for ejecting a first propellant, each comprising:
   a high speed fluid ejection nozzle coupled to a propellant supply, and
   a propellant-air mixing system comprising at least one fluid intake member having an inlet end and an outlet end, the inlet end being in fluidic communication with the fluid ejection nozzle to receive the first propellant ejected from the nozzle,
   the propellant-air mixing system being convertible between a closed position and an open position, wherein in the open position the inlet entrains air to be mixed with the propellant to form a propellant-air mixture and in the closed position the air entrainment is blocked,
   wherein the first propellant is an oxidizer and/or a fuel;

at least one combustor positioned downstream of the at least one propellant ejector system for combusting a fuel, said combustor having an inlet portion in fluidic communication with the outlet end of the propellant-air mixing system for receiving the first propellant ejected by the propellant ejector system, and an outlet portion to exhaust combustion products, the combustor further being connected to an ignition source;

optionally, at least one propellant injector positioned downstream of the propellant ejector system for injecting a second propellant into the combustor, wherein the second propellant is a fuel and/or an oxidizer; and an exhaust nozzle downstream of the outlet portion of the combustor, wherein the fuel for combustion in the combustor is a solid fuel provided in the combustor, a fuel injected from the at least one propellant injector, and/or a fuel ejected from the propellant ejector system.

In accordance with another aspect of the present invention, there is provided a method of achieving one or more propulsion modes via the multimode the propulsion system as described herein, wherein the method comprises:

(i) achieving a first rocket mode by ejecting an oxidizer via the propellant ejector system without air entrainment into the combustor, and generating thrust by combusting the ejected oxidizer in the presence of a solid fuel provided in the combustor and/or a fuel injected by the propellant injector, and optionally augmenting the ejected oxidizer by injecting additional oxidizer and/or a fuel;

(ii) achieving a second rocket mode by ejecting a fuel via the propellant ejector system without air entrainment into the combustor, and generating thrust by combusting the ejected fuel in the presence of an oxidizer injected by the propellant injector, and optionally augmenting the ejected fuel by injecting an oxidizer and/or additional fuel;

(iii) achieving a first ramjet mode by ejecting fuel while entraining air via the propellant ejector systems to form a fuel-air mixture upstream of the combustor, and generating thrust by combusting the fuel-air mixture in the combustor, and optionally augmenting the fuel-air mixture by injecting additional fuel and/or an oxidizer; and (iv) achieving a second ramjet mode by ejecting an oxidizer while entraining air via the propellant ejector systems to form a oxidizer-air mixture upstream of the combustor, and generating thrust by combusting the oxidizer-air mixture in the presence of a fuel injected by the propellant injector and/or in the presence of a solid fuel provided in the combustor, and optionally augmenting the oxidizer-air mixture by injecting an oxidizer and/or additional fuel.

BRIEF DESCRIPTION OF THE FIGURES

The invention will now be described by way of an exemplary embodiment with reference to the accompanying simplified, diagrammatic, not-to-scale drawings. In the drawings:

FIGS. 7A and 7B are schematic cross-sectional views of a multi-mode propulsion system in accordance with an embodiment of the present invention. FIG. 7A depicts the system in a Hybrid Rocket mode, and FIG. 7B depicts the system in an ejector assisted Hybrid Rocket/Ramjet mode.

FIGS. 8A and 8B are schematic cross-sectional views of a multi-mode propulsion system in accordance with another embodiment of the present invention. FIG. 8A depicts the system in a Hybrid Rocket mode, and FIG. 8B depicts the system in an ejector assisted Hybrid Rocket/Ramjet mode.

FIGS. 9A and 9B are schematic cross-sectional views of a multi-mode propulsion system in accordance with another embodiment of the present invention. FIG. 9A depicts the system in an ejector assisted Ramjet Mode, and FIG. 9B depicts the system in a liquid/gaseous rocket mode.

FIGS. 10A and 10B are schematic cross-sectional views of a multi-mode propulsion system in accordance with another embodiment of the present invention. FIG. 10A depicts the system in an ejector assisted Ramjet Mode, and FIG. 10B depicts the system in liquid/gaseous rocket mode.

DETAILED DESCRIPTION OF THE INVENTION

Unless defined otherwise, all technical and scientific terms used herein have the same meaning as commonly understood by one of ordinary skill in the art to which this invention belongs.

As used herein, the term "propulsion system" refers to a system that produces thrust by expelling reaction mass to move or derive an object forward or backwards. Examples of such a system includes rocket engines and jet engines (e.g., turbofan, ramjet, scramjet, etc.).

As used herein, the term "fluidic communication" refers to a connection/coupling between two elements with the capability to transfer fluids (e.g., liquid/gas) between connected/coupled elements.

As used herein, the term "Mach number" refers to the ratio of the speed of a body (such as aircraft) to the speed of sound in the surrounding medium. It is often used with a numeral (as Mach 1, Mach 2, etc.) to indicate the multiples of speed of sound, twice the speed of sound, etc. Mach No. $M<1$ represent indicate the subsonic conditions, $M=1$ indicate sonic condition, and $M.>$ indicate supersonic conditions.

As used herein, the term "about" refers to approximately a +/−10% variation from a given value. It is to be understood that such a variation is always included in any given value provided herein, whether or not it is specifically referred to.

The present invention provides a variable, multimode propulsion system which combines two or more basic propulsion cycles to produce an overall superior propulsion system.

The multi-mode propulsion system of the present invention utilizes pressurized and optionally pre-heated unburned propellant (rather than combustion products of primary engine) to entrain air into the combustion chamber of a combustor to generate thrust, wherein a propellant ejector system comprising a high speed ejection nozzle coupled with a propellant-air mixing system is placed upstream of the combustor to entrain and pressurize the atmospheric air to form a propellant-air mixture, which is then mixed with optional additional fuel and combusted in the combustor.

The present system therefore operates by sacrificing a small amount of available useful energy (also known as exergy) from the on-board propellant to entrain and increase the exergy of air as a second propellant, which allows for optimization of fuel-air mixture for combustion leading to a significant increase in thrust. The placement of the propellant ejector system of the present invention upstream of the combustor provides the ability to tune the oxidizer, fuel, and air mixture for the combustion to generate thrust.

The multi-mode propulsion system of the present invention is simple with few moving parts, and is extremely flexible as it can be easily switched between rocket, ramjet, and hybrid rocket-ramjet modes with few modifications.

The multimode propulsion system of the present invention can operate over a wide range of flight conditions of an aerospace vehicle.

The propulsion system of the present invention can operate over a wide range of flight Mach numbers in air-breathing mode, from rest up to hypersonic speeds at performance levels (fuel efficiency, specific impulse) comparable to turbofans, turbofans with afterburners, ramjets, and scramjets. The propulsion system can also operate over full range of Mach numbers and altitudes of conventional rockets when operating in rocket mode.

The propulsion system of the present invention also provides a complete propulsion system for a single-stage-to-orbit (SSTO) launch vehicle, and increases the fuel efficiency (specific impulse) of rockets due to incorporation of multi-stage propellant-air mixing device as described herein.

The propulsion system of the present invention further improves air-assisted rockets, as thrust can be generated from very low speed to high speed. The propulsion system of the present invention can also improve the flight speed and altitude limits of air-breathing engines by fully or partially switching to hybrid rocket mode in flight.

The propulsion system of the present invention can augment and enhance the performance of traditional propulsion engines, as described below:

for a rocket:
  less onboard oxidizer would be stored,
  greater fuel efficiency in the atmosphere,
  increased altitude and range;
for a solid, liquid, or gaseous fueled ramjet engine:
  thrust can be produced at a stand-still by ejecting oxidizer or fuel,
  operational altitude limits can be increased by ejecting oxidizer,
  thrust can be increased by further pressurizing ram air, The present invention provides a multimode propulsion system, which comprises at least one propellant ejector system for ejecting a first propellant from a propellant supply, at least one combustor downstream of the propellant ejector system, and an exhaust nozzle downstream of the at least one combustor.

The propellant ejector system of the present invention comprises a high speed (supersonic, subsonic or hypersonic) fluid ejection nozzle coupled to a propellant supply, and a propellant-air mixing system comprising at least one fluid intake member.

The at least one fluid intake member has an inlet end and an outlet end, wherein the inlet end is in fluidic communication with the fluid ejection nozzle to receive the propellant ejected from the nozzle. The propellant-air mixing system is configured to be convertible between a closed position and an open position, wherein in the open position the inlet entrains air to be mixed with the propellant to form a propellant-air mixture, and in the closed position the propellant is ejected without air entrainment.

In some embodiments, the fluid intake member is comprised of one or more ducts of different shapes, sizes and/or cross-sectional areas. The one or more ducts can have any shape, such as round, square, rectangular, oval, etc. The ducts can have a continuous or varying cross-sectional area between the ends thereof.

The combustor has an inlet portion in fluidic communication (directly or indirectly) with the outlet end of the at least one fluid intake member of the propellant-air mixing system, and an outlet portion in fluidic communication with the exhaust nozzle to exhaust combustion products. The combustor is further connected to an ignition source. In some embodiments, the combustor further comprises a flame holder.

In some embodiments, the propellant system further includes at least one second propellant injector positioned downstream of the propellant ejector system for injecting a second propellant into the combustor.

The first and second propellants independently can be an oxidizer and/or a fuel. The second oxidizer can be different or same as the primary oxidizer.

The fuel can be a solid fuel, which can be introduced into the combustor as desired from a fuel supply provided in the engine or can be provided within the combustor. Alternatively, the fuel can be in a liquid or gaseous form that can be ejected from the ejection nozzle, be injected via the second propellant injector, or both.

The first and second propellants can be in a gaseous form or a liquid form. The ejection nozzle is configured to eject the propellant in a gaseous form or a liquid form.

Oxidizers and fuels suitable for the present system can be selected from propellants and fuel suitable in the propulsion systems (such as known in automobile, aerospace and aviation industry), in view of usage requirements.

Non-limiting examples of the oxidizer propellants include $H_2O_2$, liquid oxygen (LOX), liquid fluorine, fluorine/LOX mix (FLOX), dinitrogen tetraoxide, liquid ozone, $ClF_3$, $ClF_5$, nitric acid, nitrogen tetroxide, nitrous oxide, ammonium perchlorate, chlorine pentafluoride, or a combination thereof.

Non-limiting examples of the fuel propellants include liquid hydrogen, hydrocarbons such as kerosene, alcohol, hydrazine and its derivatives, rubber, paraffin, or a combination thereof.

In some embodiments, the system is configured to heat the propellant prior to being ejected from the ejection nozzle. In some embodiments, the system comprises a heat source for heating the propellant prior to being ejected from the ejection nozzle. In some embodiments, the ejector system is configured to receive heat from a heat exchanger used for cooling the combustion chamber and/or exhaust nozzle.

In some embodiments, the at least one fluid intake member of the propellant-air mixing system comprises a plurality of concentric fluid intake ducts arranged in series. Each of the concentric intake ducts have an inlet and an outlet, wherein the inlet of each duct has a cross-sectional area greater than cross-sectional area of the outlet of a preceding intake duct, thereby providing an annular gap between two adjacent intake ducts for entraining additional air when the propellant-air mixture is passed from one intake duct into the subsequent intake duct.

In some embodiments, the opening and closing of the propellant-air mixing device is achieved by opening and closing of the inlets of the one or more of the fluid intake ducts of the mixing device.

In some embodiments, the system further includes one or more diffuser/diffuser ducts positioned between the outlet of the fluid intake member and the inlet of the combustor.

In some embodiments, in the system comprising a plurality of concentric fluid intake ducts arranged in series, one or more diffuser ducts are positioned between the outlet end of the fluid intake duct proximate the combustor and the inlet portion of the combustor.

The diffuser duct can be used to decelerate the flow of propellant or propellant-air mixture before it enters the combustor to further improve combustion performance. The cross-sectional area of the one or more diffuser ducts increases from the inlet end toward outlet end.

In some embodiments, in the system comprising a plurality of concentric fluid intake ducts arranged in series, one or more of the at least one of the plurality of fluid intake ducts have a continuous and/or varying cross-sectional area.

In some embodiments, the walls of the at least one intake member has a streamwise variation in cross-sectional shape and area. An example of such a wall shape includes an airfoil or aerofoil.

In some embodiments, in the system comprising a plurality of concentric fluid intake ducts arranged in series, the walls of at least one of the plurality of fluid intake ducts have an airfoil or aerofoil type cross sectional shape.

In some embodiments, the system comprises at least one propellant ejector system, each of which is in fluidic communication with one of said at least one single combustor.

In some embodiments, the system comprises two or more propellant ejector systems in fluidic communication with one or more of said at least one combustor.

In some embodiments, the system comprises two or more propellant ejector systems in fluidic communication with each of said at least one combustor.

In some embodiments, the system comprises two or more propellant ejector systems in fluidic communication with a single combustor.

In some embodiments, the system comprises two or more propellant ejector systems and two or more combustors, wherein each of the propellant ejector systems is in fluidic communication with a respective combustor.

In some embodiments, the propellant ejector system is integrated into the body of a vehicle. In some embodiments, the propulsion system is designed as standalone modular system configured to be incorporated in a vehicle to form the engine of the vehicle.

In some embodiments, the propulsion system of the present invention is for an aerospace vehicle.

The present invention further provides a method of achieving multimode propulsion(s) in a vehicle, using the propulsion system as described herein.

In some embodiments, the method of the present invention comprises achieving one or more of the following modes:
(i) achieving a first rocket mode by ejecting an oxidizer via the propellant ejector system without air entrainment into the combustor, and generating thrust by combusting the ejected oxidizer in the presence of a solid fuel provided in the combustor and/or a fuel injected by the propellant injector, and optionally augmenting the ejected oxidizer by injecting additional oxidizer and/or a fuel;
(ii) achieving a second rocket mode by ejecting a fuel via the propellant ejector system without air entrainment into the combustor, and generating thrust by combusting the ejected fuel in the presence of an oxidizer injected by the propellant injector, and optionally augmenting the ejected fuel by injecting an oxidizer and/or additional fuel;
(iii) achieving a first ramjet mode by ejecting fuel while entraining air via the propellant ejector systems to form a fuel-air mixture upstream of the combustor, and generating thrust by combusting the fuel-air mixture in the combustor, and optionally augmenting the fuel-air mixture by injecting additional fuel and/or an oxidizer; and
(iv) achieving a second ramjet mode by ejecting an oxidizer while entraining air via the propellant ejector systems to form a oxidizer-air mixture upstream of the combustor, and generating thrust by combusting the oxidizer-air mixture in the presence of a fuel injected by the propellant injector and/or in the presence of a solid fuel provided in the combustor, and optionally augmenting the oxidizer-air mixture by injecting an oxidizer and/or additional fuel.

In some embodiments, the method comprises achieving at least one of the rocket modes (i) and (ii) in combination with the ramjet modes (iii) and/or (iv).

In some embodiments, the propulsion system is configured to achieve the first rocket mode (i) and the second ramjet mode (iv).

In some embodiments, the propulsion system is configured to achieve the second rocket mode (ii) and the first ramjet mode (iii).

In some embodiments, the first rocket mode (i) is achieved by ejecting the oxidizer via the propellant ejector system without air entrainment into the combustor, and generating thrust by combusting the ejected oxidizer in the presence of the solid fuel provided in the combustor.

In some embodiments, the second ramjet mode (iv) is achieved by ejecting the oxidizer while entraining air via the propellant ejector systems to form an oxidizer-air mixture, and generating thrust by combusting the oxidizer-air mixture in the presence of the solid fuel provided in the combustor.

In some embodiments, achieving the second ramjet mode (iv) comprises ejecting the oxidizer as primary propellant through the primary ejector system while entraining air to form the oxidizer-air mixture and injecting the fuel as secondary propellant to form an augmented oxidizer-air-fuel mixture, and combusting the augmented oxidizer-air-fuel mixture in the combustor to generate the thrust.

In some embodiments, achieving the first ramjet mode (iii) comprises ejecting the fuel as primary propellant through the primary ejector system while entraining air to form the fuel-air mixture, and injecting the additional fuel as secondary propellant to form an augmented fuel-air mixture, and combusting the augmented fuel-air mixture in the combustor to generate the thrust.

In some embodiments, achieving the first ramjet mode (iii) comprises ejecting the fuel as primary propellant through the primary ejector system while entraining air to form the fuel-air mixture and injecting the oxidizer as secondary propellant to form an augmented fuel-air-oxidizer mixture, and combusting the augmented fuel-air-oxidizer mixture in the combustor to generate the thrust.

In some embodiments, the method of achieving multi-mode propulsions comprises:
a) achieving a rocket mode by:
  (i) ejecting an oxidizer via the propellant ejector system without air entrainment into the combustor, and generating thrust by combusting the ejected oxidizer in the presence of a solid fuel provided in the combustor, and optionally augmenting the ejected oxidizer by injecting additional oxidizer and/or a fuel; or
  (ii) ejecting a fuel via the propellant ejector system without air entrainment into the combustor, and generating thrust by combusting the ejected fuel in the presence of an oxidizer injected by the propellant injector, and optionally augmenting the ejected fuel by injecting an oxidizer and/or additional fuel; or
  (iii) ejecting an oxidizer via the propellant ejector system without air entrainment into the combustor, and generating thrust by combusting the ejected oxidizer in the presence of a fuel injected by the propellant injector, and optionally injecting additional oxidizer and/or fuel; and
b) achieving a ramjet mode by:
  (i) ejecting fuel while entraining air via the propellant ejector systems to form a fuel-air mixture upstream of the combustor, and generating thrust by combusting the fuel-air mixture in the combustor, and optionally augmenting the fuel-air mixture by injecting additional fuel and/or an oxidizer; or
  (ii) ejecting an oxidizer while entraining air via the propellant ejector systems to form a oxidizer-air mixture upstream of the combustor, and generating thrust by combusting the oxidizer-air mixture in the presence of a fuel injected by the propellant injector and/or in the presence of a solid fuel provided in the combustor, and optionally augmenting the oxidizer-air mixture by injecting an oxidizer and/or additional fuel.

In some embodiments, the method of achieving multi-mode propulsions comprises:
achieving a rocket mode by ejecting an oxidizer via the propellant ejector system without air entrainment into the combustor, and generating thrust by combusting the ejected oxidizer in the presence of a solid fuel provided in the combustor; and optionally augmenting the fuel-air mixture by injecting additional fuel and/or an oxidizer; and
achieving ramjet mode by ejecting an oxidizer while entraining air via the propellant ejector systems to form a oxidizer-air mixture upstream of the combustor, and generating thrust by combusting the oxidizer-air mixture in the presence of a solid fuel provided in the combustor, and optionally augmenting the oxidizer-air mixture by injecting an oxidizer and/or additional fuel.

In some embodiments, the method of achieving multi-mode propulsions comprises:
achieving a rocket mode by ejecting a fuel via the propellant ejector system without air entrainment into the combustor, and generating thrust by combusting the ejected fuel in the presence of an oxidizer injected by the propellant injector, and optionally augmenting the ejected fuel by injecting an oxidizer and/or additional fuel; and
achieving ramjet mode by ejecting fuel while entraining air via the propellant ejector systems to form a fuel-air mixture upstream of the combustor, and generating thrust by combusting the fuel-air mixture in the combustor, and optionally augmenting the fuel-air mixture by injecting additional fuel and/or an oxidizer.

In some embodiments, method further comprises ejecting a propellant to increase pressure of incoming flow of the oxidizer-air mixture or the fuel-air mixture.

In some embodiments, the propellant is an oxidizer, and the oxidizer is preheated prior to the ejection via the propellant ejector system to achieve the first rocket mode (i), the third rocket mode (iii), and/or the second ramjet mode.

In some embodiments, the preheating is achieved by heat obtained from the combustor and/or exhaust nozzle via a respective heat exchanger.

In some embodiments, the oxidizer and/or the fuel is ejected at a supersonic speed.

In some embodiments, the hybrid rocket mode is achieved by ejecting a pre-heated oxidizer at a supersonic speed via the propellant ejector system without air entrainment into the combustor, and combusting a solid fuel in the presence of the ejected oxidizer in the combustor to generate thrust.

In some embodiments, a ramjet mode is achieved by ejecting a preheated oxidizer at a supersonic speed, while entraining air via the propellant ejector systems to form an oxidizer-air or fuel-air mixture, upstream of the combustor, and combusting the oxidizer-air or fuel-air mixture with a solid fuel in the combustor to generate thrust.

In some embodiments, the liquid/gaseous rocket mode is achieved by ejecting a pre-heated oxidizer at a supersonic speed via the propellant ejector system without air entrainment into the combustor, and combusting a liquid or gaseous fuel in the presence of the ejected oxidizer in the combustor to generate thrust, and optionally injecting additional oxidizer and/or fuel prior to the combustion.

The present invention provides an improved system and method of achieving multiple propulsion modes in a vehicle. The presence of the propellant ejector system comprising a high speed fluid ejection nozzle and a propellant-air mixing system as described herein, allows for ejection of a pre-heated fuel/oxidizer, pressurization, and acceleration to supersonic speeds to achieve a desired propulsion mode. In a normal engine, fuel is injected at room temp, pressurized only to the combustor pressure, and injected at low speeds.

The system of the present invention provides an unique way to transfer exergy (which is a thermodynamic quantity determined from a combination of temperature, velocity, and pressure) from an ejected propellant to the entrained air, which results in a final fuel and/or air-mixture that is at an ideal/optimal ratio for efficient combustion, which does not include unwanted combustion products in the reactive mixture that otherwise occurs in typical rocket ejectors. Moreover, pressure losses are much lower than that of conventional rockets which use conventional injectors or use an injector plate.

To gain a better understanding of the invention described herein, the following examples are set forth. It will be understood that these examples are intended to describe illustrative embodiments of the invention and are not intended to limit the scope of the invention in any way.

EXAMPLES

Figure 1:
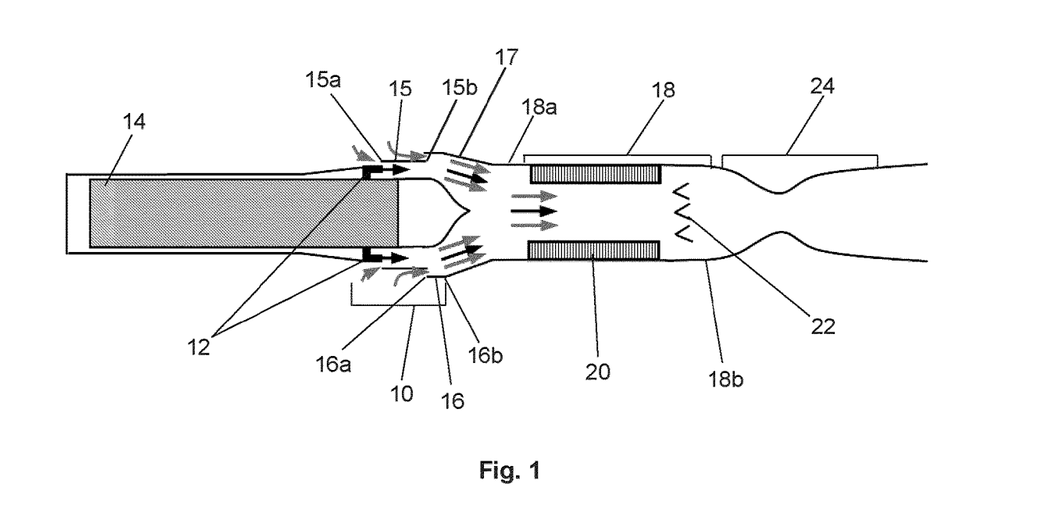
FIG. 1 schematic depiction of a multi-mode propulsion system in accordance with an embodiment of the present invention.

FIG. 1 schematically illustrates an example of the multi-mode propulsion system of the present invention, which comprises a propellant ejector system 10, which comprises one or more fluid ejection nozzles 12 coupled to a propellant supply 14, and a propellant-air mixing system comprising two concentric fluid intake ducts 15 and 16, each having an inlet end 15a and 16a and an outlet end 15a and 16b, respectively. The inlet end 15a of the fluid intake duct 15 is in fluidic communication with the fluid ejection nozzles 12, and the outlet end 15b is in fluidic communication with the inlet end 16a of the duct 16. The cross sectional area of the inlet end 16a is greater than the cross-sectional area of the outlet end 15b, thereby providing an annular gap between therebetween. The outlet end 16b of the fluid intake duct 16 is in communication with the inlet portion 18a of a combustor 18 via a diffuser duct 17. The combustor is provided with solid fuel 20 and a flame holder 22. The outlet portion 18b of the combustor is in fluid communication with exhaust nozzle 24.

Figure 2:
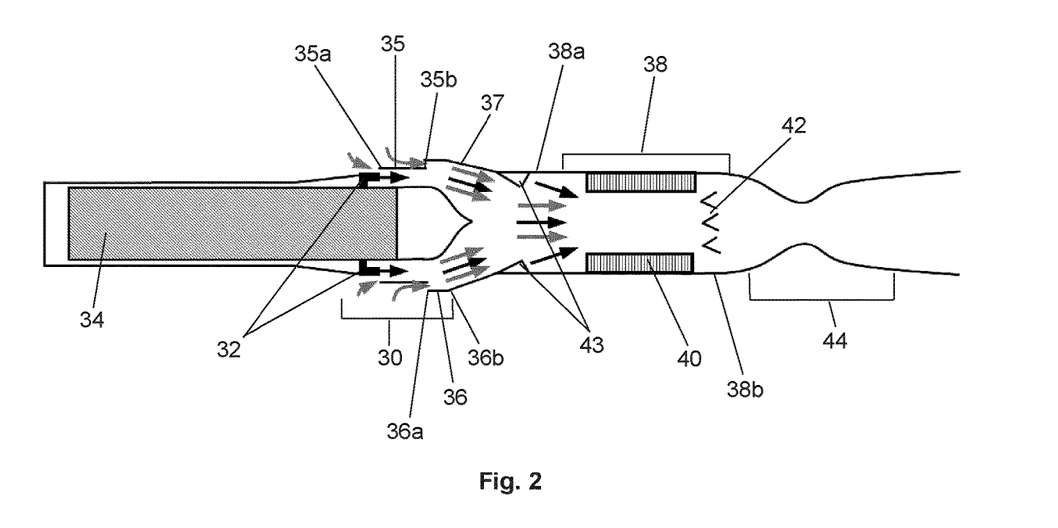
FIG. 2 is a schematic depiction of a multi-mode propulsion system in accordance with another embodiment of the present invention.

FIG. 2 schematically illustrates another example of the multi-mode propulsion system of the present invention, which comprises a propellant ejector system 30, which comprises one or more fluid ejection nozzles 32 coupled to a propellant supply 34, and a propellant-air mixing system comprising a fluid intake ducts 35 and 36, each having an inlet end 35a and 36a and an outlet end 35b and 36b, respectively. The inlet end 35a of the fluid intake duct 35 is in fluidic communication with the fluid ejection nozzles 32, and the outlet end 35b in fluidic communication with the inlet end 36a of the duct 36. The cross sectional area of the inlet end 36a is greater than the cross-sectional area of the outlet end 35b, thereby providing an annular gap between therebetween. The outlet end 36b of the fluid intake duct 36 is in communication with the inlet portion 38a of a combustor 38 via a diffuser duct 37. The combustor is provided with solid fuel 40 and a flame holder 42. Propellant injectors 43 are provided downstream of the propellant ejector system 30. The outlet portion 38b of the combustor is in fluid communication with exhaust nozzle 44.

Figure 3:
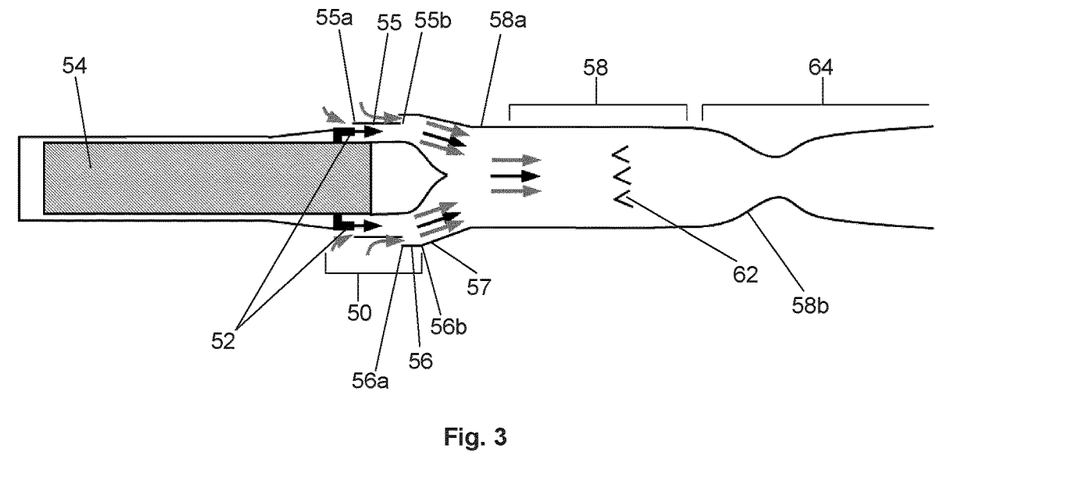
FIG. 3 is a schematic depiction of a multi-mode propulsion system in accordance with another embodiment of the present invention.

FIG. 3 schematically illustrates an example of the multi-mode propulsion system of the present invention, which comprises propellant ejector system 50, which comprises a fluid ejection nozzles 52 coupled to a propellant supply 54, and a propellant-air mixing system comprising two concentric fluid intake ducts 55 and 56, each having an inlet end 55a and 56a, and an outlet end 55b and 56b, respectively. The inlet end 55a of the fluid intake duct 55 is in fluidic communication with the fluid ejection nozzles 52, and the outlet end 55b is in fluidic communication with the inlet end 56a of the duct 56. The cross sectional area of the inlet end 56a is greater than the cross-sectional area of the outlet end 55b, thereby providing an annular gap between therebetween. The outlet end of each fluid intake duct 56 is in communication with the inlet portion 58a of a combustor 58 via a diffuser duct 57. The combustor is provided with a flame holder 62. The outlet portion 38b of the combustor is in fluid communication with exhaust nozzle 64.

Figure 4:
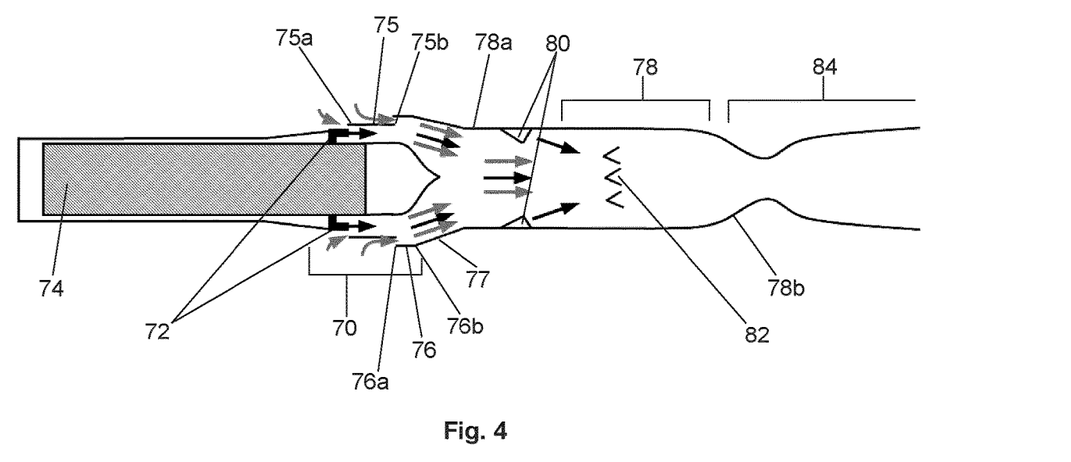
FIG. 4 is a schematic depiction of a multi-mode propulsion system in accordance with another embodiment of the present invention.

FIG. 4 schematically illustrates another example of the multi-mode propulsion system of the present invention, which comprises a propellant ejector system 70, which comprises one or more fluid ejection nozzles 72 coupled to a propellant supply 74, and a propellant-air mixing system comprising two concentric fluid intake ducts 75 and 76, each having an inlet end 75a, 76a and an outlet end 75b, 76b, respectively. The inlet end 75a of the fluid intake duct is in fluidic communication with the fluid ejection nozzles 72 and the outlet end 75b is in fluidic communication with the inlet end 76a of the duct 76. The cross sectional area of the inlet end 76a is greater than the cross-sectional area of the outlet end 75b, thereby providing an annular gap between therebetween. The outlet end 76b of the fluid intake duct 76 is in communication with the inlet portion of a combustor 78 via a diffuser duct 77. Propellant injectors 80 are provided downstream of the propellant ejector system 70. The combustor is provided with a flame holder 82. The outlet portion 78b of the combustor is in fluid communication with exhaust nozzle 84.

Figure 5:
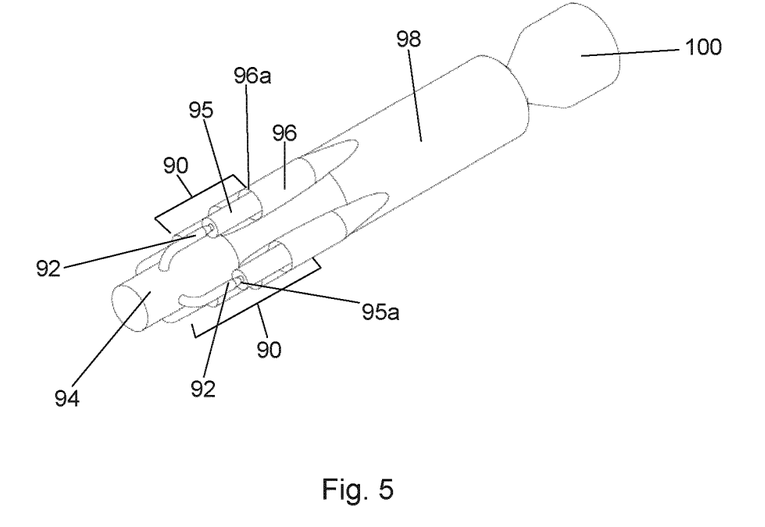
FIG. 5 is a schematic perspective view of a multi-mode propulsion system in accordance with an embodiment of the present invention.

FIG. 5 depicts a schematic perspective view of an example of the multi-mode propulsion system of the present invention, which comprises four propellant ejector systems 90 connected to a single combustor 98. Each of the propellant ejector systems 90 comprises a fluid ejection nozzle 92 coupled to a propellant supply 94, and a propellant-air mixing system comprising two concentric fluid intake ducts 95 and 96, each having an inlet end 95a, 96a and an outlet end (not show), respectively. The inlet end 95a of the fluid intake duct 95 is in fluidic communication with a fluid ejection nozzle 92 and the outlet end of duct 95 is in fluidic communication with the inlet end 96a of the duct 96. The outlet end of the duct 96 is in fluidic communication with a single combustor 98. The outlet portion of the combustor is in fluid communication with an exhaust nozzle 100.

Figure 6:
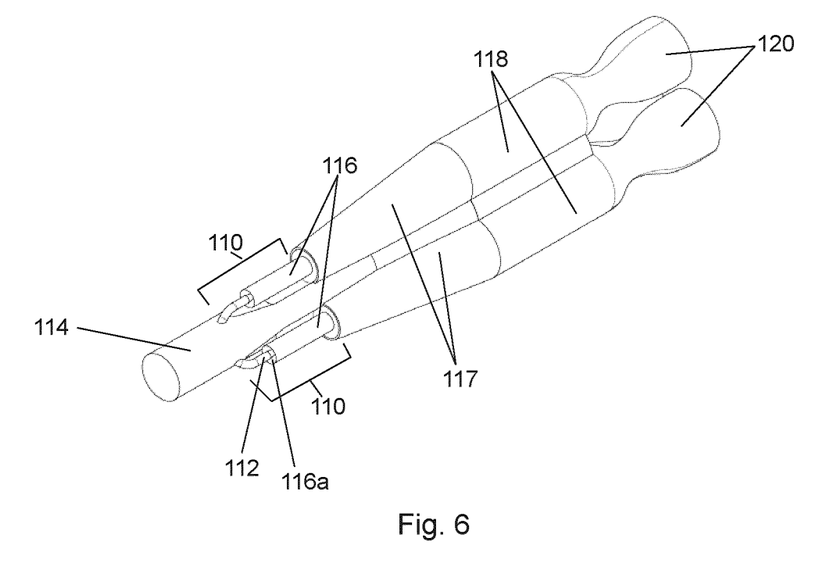
FIG. 6 is a schematic perspective view of a multi-mode propulsion system in accordance with another embodiment of the present invention.

FIG. 6 depicts a schematic perspective view of an example of the multi-mode propulsion system of the present invention, which comprises three primary propellant ejector systems 110 and three combustors 118, wherein each of the propellant ejector systems is in fluidic communication with a respective combustor. Each propellant ejector system 110 comprises a fluid ejection nozzle 112 coupled to a propellant supply 114, and a propellant-air mixing system comprising fluid intake ducts 116. The inlet end 116a of the fluid intake duct is in fluidic communication with the fluid ejection nozzle 112 and the outlet end (not shown) is in fluidic communication with a respective corresponding combustor 118 via a diffuser duct 117. The outlet portion of the combustor 118 is in fluid communication with its respective exhaust nozzle 120.

Figure 7A:
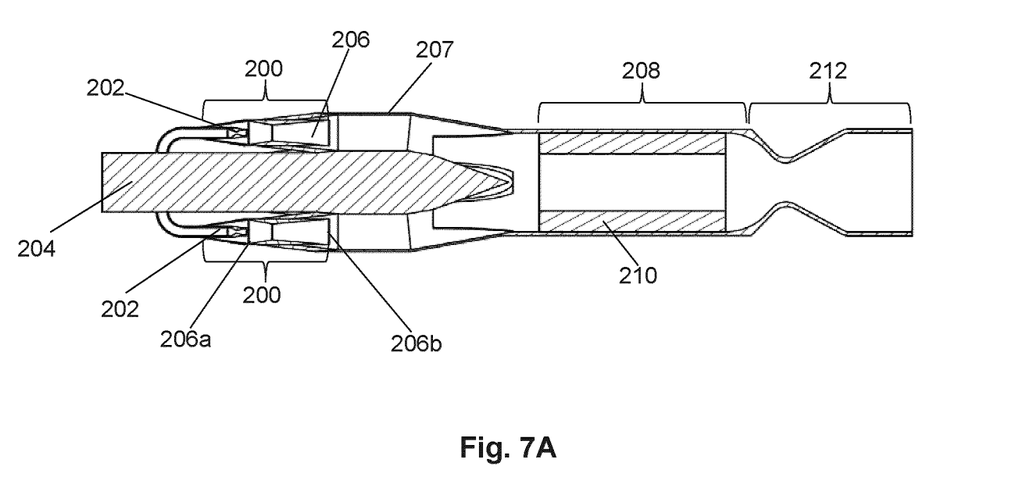
Figure 7B:
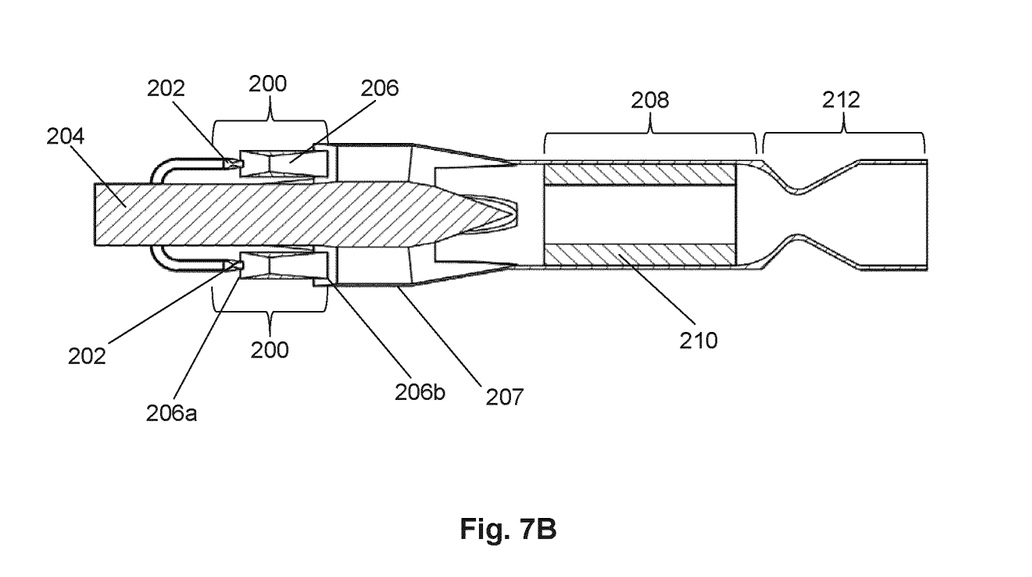

FIGS. 7A and 7B are schematic cross-sectional views of a multi-mode propulsion system, wherein FIG. 7A depicts the system in a "Hybrid Rocket" mode, and FIG. 7B depicts the system in a Ramjet mode.

This system configuration comprises propellant ejector systems 200, each comprising a fluid ejection nozzle 202 coupled to a propellant supply 204, and a propellant-air mixing system comprising a fluid intake duct 206 having an inlet end 206a and an outlet end 206b. The inlet end 206a is in fluidic communication with the fluid ejection nozzle 202 and the outlet end 206b is in fluidic communication with the combustor 208 via a diffuser duct 207. The combustor is provided with solid fuel 210. The outlet portion of the combustor is in fluid communication with exhaust nozzle 212.

The hybrid rocket mode depicted in FIG. 7A is achieved by generating thrust by directly injecting an oxidizer via the propellant ejector system 200 without air entrainment (by allowing the propellant-air mixing system to be in the closed position) into the combustor 208 provided with solid fuel grain 210, wherein the oxidizer from upstream enters the combustor, entrains vaporized or melted solid fuel, which subsequently combusts. The combustion products expand and accelerate through the exhaust nozzle to produce thrust.

This mode is useful at launch where the available pressure from the ejectors is too low and the system is configured to transition to a Ramjet mode later in flight. Similarly, this hybrid rocket propulsion mode could also operate at the end of an ascent trajectory for space access, after a ramjet mode is no longer feasible, when the vehicle experiences the vacuum of space.

The ramjet mode depicted in FIG. 7B is achieved by generating thrust by ejecting an oxidizer or fuel while entraining air via the propellant ejector systems 200 upstream of the combustor 208 provided with solid fuel grain 210, wherein oxidizer-air mixture or fuel-air mixture from upstream enters the combustor, entrains melted solid fuel and subsequently combusts.

In this system configuration, ejecting oxidizer to achieve rocket mode, and/or ejecting oxidizer while entraining atmospheric air reduces the amount of oxidizer that must be stored on board and increases specific impulse (which directly impacts acceleration and range). Ejecting fuel while entraining atmospheric air would be useful in-flight regimes where the combustion is too lean.

Figure 8:
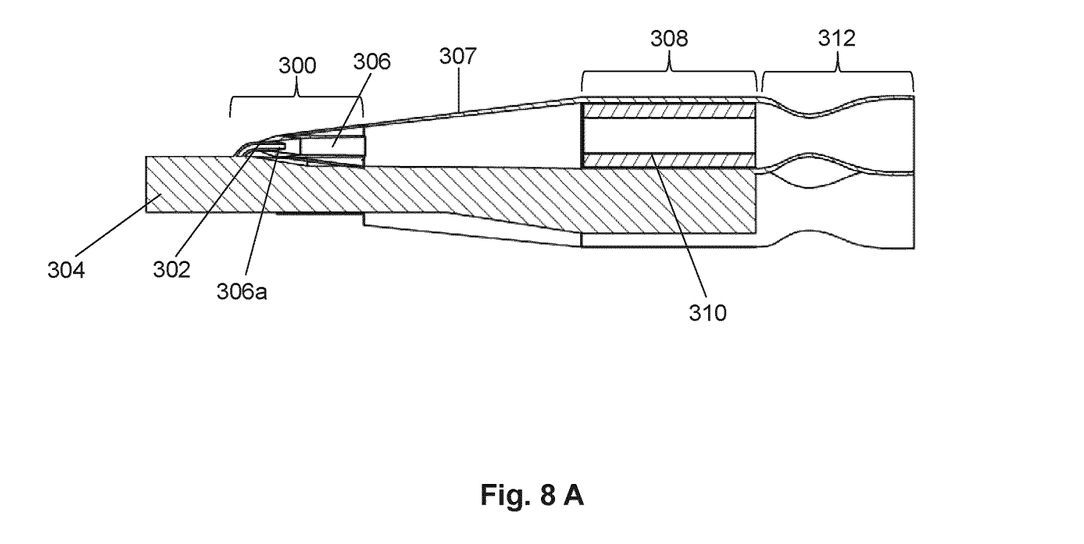

FIGS. 8A and 8B are schematic cross-sectional views of an example of a multi-mode propulsion system, wherein FIG. 8A depicts the system in a "Hybrid Rocket" mode, and FIG. 8B depicts the system in an ejector assisted Hybrid Rocket/Ramjet mode.

This system configuration comprises three primary propellant ejector systems 300 and three combustors 308, wherein each of the propellant ejector system is in fluidic communication with a respective combustor. Each propellant ejector system 300 comprises a fluid ejection nozzle 302 coupled to a propellant supply 304, and a propellant-air mixing system comprising a fluid intake duct 306 having an inlet end 306a and an outlet end (not shown). The inlet end 306a is in fluidic communication with a respective fluid ejection nozzle 302 and the outlet end is in fluidic communication with a respective combustor 308 via a diffuser duct 307. Each combustor is provided with solid fuel 310. The outlet portion of each combustor is in fluid communication with a respective exhaust nozzle 312.

The Hybrid Rocket and Ramjet modes are achieved in the same manner as described with respect to FIGS. 7A and 7B.

Figure 9A:
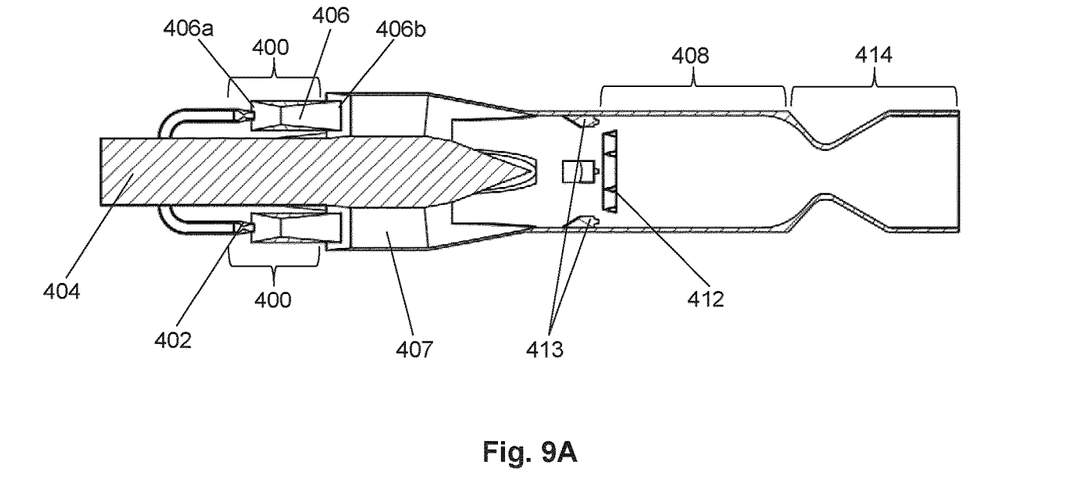
Figure 9B:
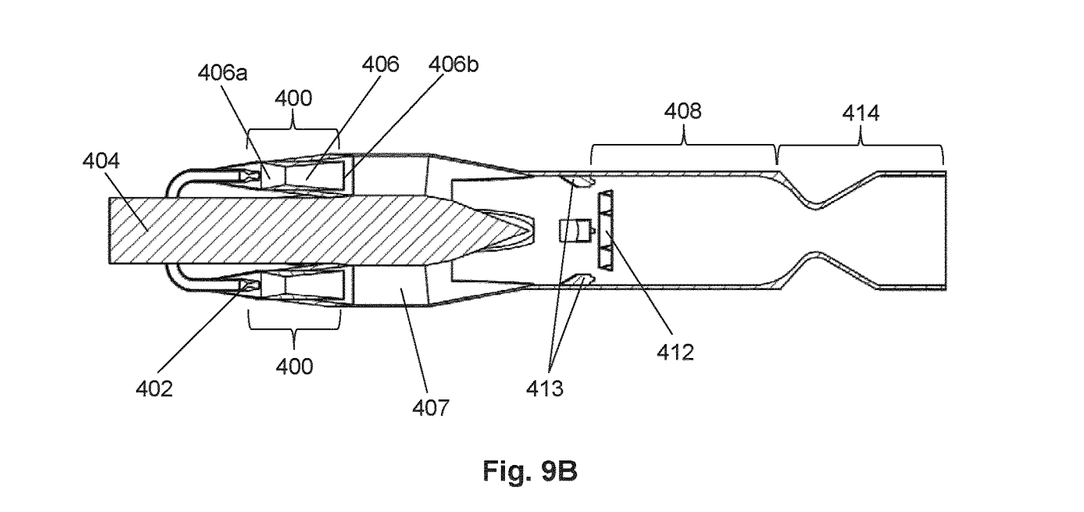

FIGS. 9A and 9B are schematic cross-sectional views of another example of a multi-mode propulsion system, wherein FIG. 9A depicts the system in an ejector assisted Ramjet mode, and FIG. 9B depicts the system in a Liquid/Gaseous Rocket mode.

This system configuration comprises propellant ejector systems 400, each comprising a fluid ejection nozzle 402 coupled to a propellant supply 404, and a propellant-air mixing system comprising a fluid intake duct 406 having an inlet end 406a and an outlet end 406b. The inlet end 406a is in fluidic communication with the fluid ejection nozzle 402 and the outlet end 406b is in fluidic communication with the combustor 408 via a respective diffuser duct 407. The combustor is provided with flame holder 412. In this embodiment, propellant injectors 413 are provided downstream of the propellant ejector system. The outlet portion of the combustor is in fluid communication with exhaust nozzle 414.

The ejector assisted ramjet mode depicted in FIG. 9A is achieved by generating thrust by ejecting fuel or oxidizer while entraining air via the propellant ejector systems 400 to form a fuel-air mixture or oxidizer-air mixture upstream of the combustor 408 provided with the flame holder 412, wherein the fuel-air mixture or the oxidizer-air mixture is combusted in the combustor and the combustion products accelerate out of the outlet nozzle 414.

In this mode, additional fuel and/or oxidizer can be added via the propellant injectors 413 to create the optimal fuel-air mixture or fuel-oxidizer mixture in the combustor. For example, at high altitudes where available atmospheric air is reduced, additional oxidizer could be added to the combustor. Conversely, in cases where too much air is being captured by the intake, fuel could be added by the propellant injectors to tune the engine performance Liquid/gaseous rocket mode depicted in FIG. 9B is achieved by generating thrust by ejecting an oxidizer without air entrainment (by allowing the propellant-air mixing system to be in the closed position) into the combustor 400 provided with propellant injectors 413 and a flame holder 412, wherein oxidizer is ejected through the system and is mixed with fuel injected by the propellant injectors before combusting in the burner. The combustion products then accelerate out of the outlet nozzle 414 producing thrust.

This mode is useful at launch when the available pressure from the propellant ejectors is too low and during transitioning out of the atmosphere (e.g., orbital ascent), and had achieved high altitude through ejector assisted Ramjet Mode.

Figure 10:
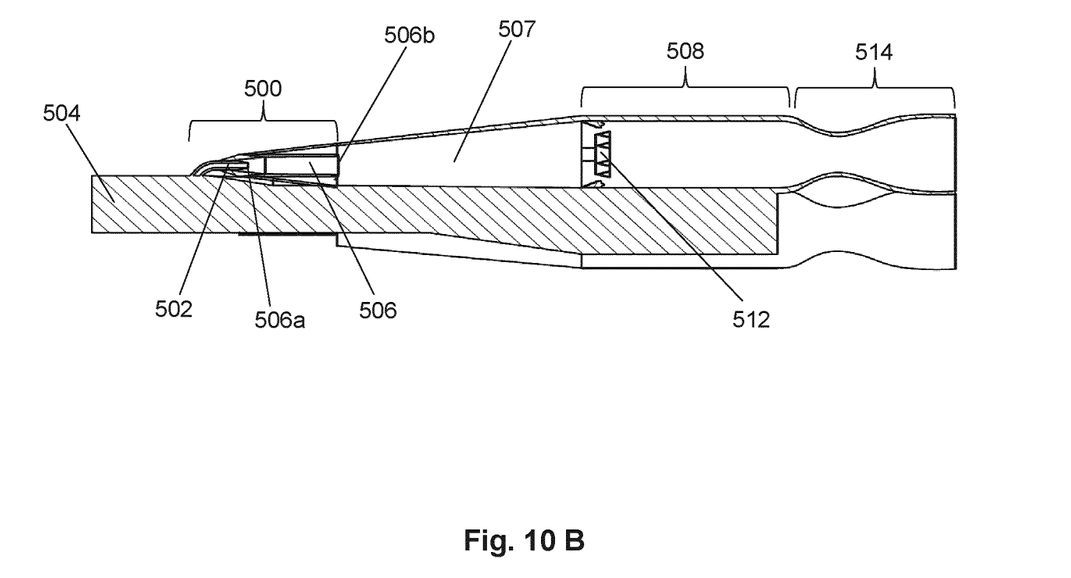
Figure 10A:
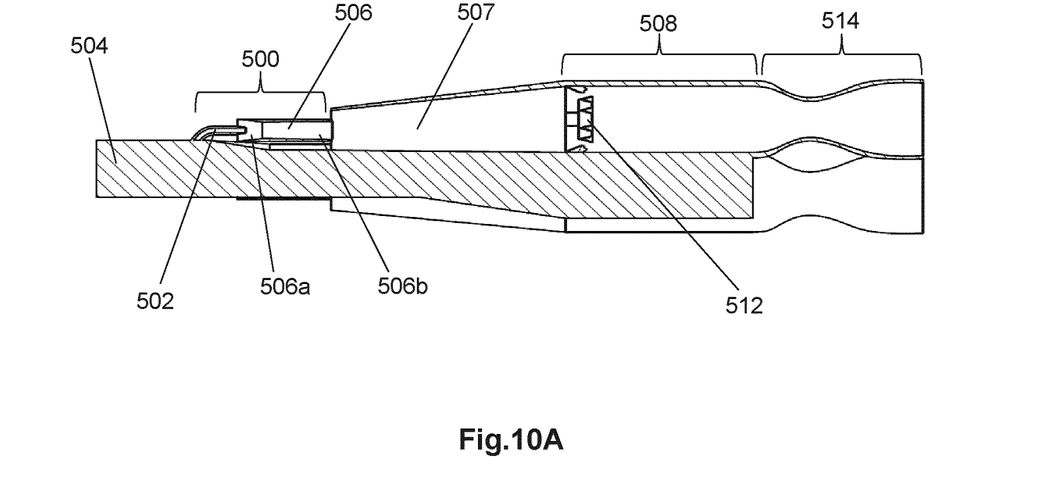

FIGS. 10A and 10B are schematic cross sectional views of another example of a multi-mode propulsion system of the present invention, wherein FIG. 10A depicts the system in an air assisted Ramjet mode, and FIG. 10B depicts the system in a Liquid/Gaseous Rocket mode.

This system configuration comprises three primary propellant ejector systems 500 and three combustors 508, wherein each of the propellant ejector systems is in fluidic communication with a respective combustor.

Each propellant ejector system 500 comprises a fluid ejection nozzle 502 coupled to a propellant supply 504, and a propellant-air mixing system comprising a fluid intake duct 506 having an inlet end 506a and an outlet end (not shown). The inlet end 506a is in fluidic communication a respective fluid ejection nozzle 502 and the outlet end is in fluidic communication with a respective combustor 508 via a diffuser duct 507. Each combustor is provided with a flame holder 512. Optionally, propellant injectors 513 are provided downstream of the propellant ejector system. The outlet portion of each combustor 508 is in fluid communication with a respective exhaust nozzle 514.

The Ramjet mode depicted in FIG. 10A, and the Liquid/Gaseous Rocket mode depicted in FIG. 10A are achieved in the same manner as described with respect to FIGS. 9A and 9B.

Figure 11:
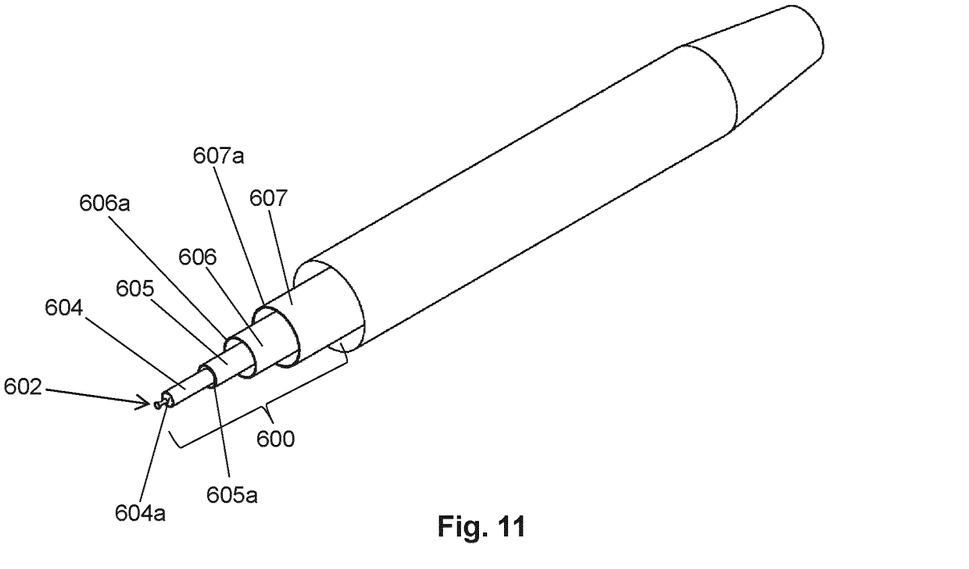
FIG. 11 is a schematic perspective view of a modular multi-mode propulsion system in accordance with an embodiment of the present invention.

FIG. 11 depicts a schematic perspective view of an example of a standalone modular propulsion system of the present invention comprising a propellant ejector system 600 (shown in part) comprising a fluid ejection nozzle 602 configured to be coupled to a propellant supply, and a propellant-air mixing system comprising concentric fluid intake ducts 604, 605, 606 and 607, each having an inlet end (604a, 605a, 606a, 607a) and an outlet end (not shown), and wherein the inlet of each duct has a cross sectional area greater than the cross sectional area of the outlet of a preceding intake duct, thereby providing an annular gap between two adjacent intake ducts for entraining additional air when the propellant-air mixture is passed from one intake duct into the subsequent intake duct. The inlet end 604a of the first fluid intake duct 604 is in fluidic communication with the fluid ejection nozzle 602 and the outlet end (not shown) is in fluidic communication with the inlet end 605a of the fluid intake duct 605, and so on. The outlet end of the intake duct 607 (not shown) is in fluidic communication with combustor (not shown).

Figure 12:
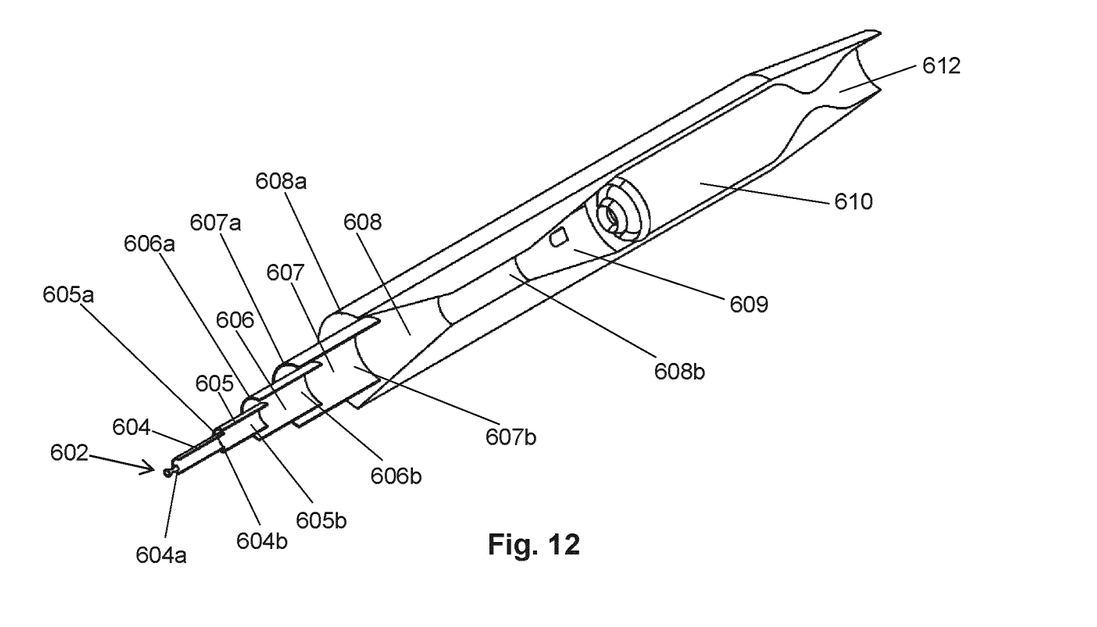
FIG. 12 is a cut away view of the modular multi-mode propulsion system of FIG. 11.

FIG. 12 is a cut-away view of the modular the modular propulsion system of FIG. 11, showing all of the fuel intake ducts 604, 605, 606, 607 and 608, each having an inlet end (604a, 605a, 606a, 607a, 608a) and an outlet end (604b, 605b, 606b, 607b and 608b). FIG. 12 also shows the fluidic communication of the outlet end 604b, 606b, 606b and 607b of intake ducts 604, 605, 606 and 607 with inlet end 605a, 606a, 607a and 608b of a respective subsequent of the fluid intake duct 605, 606, 607 and 608, and the fluidic communication of the outlet end 608b of the intake duct 608 with the inlet of the diffuser duct 609. The diffuser duct is further in fluidic communication with the combustor 610, which in turn is in connected to exhaust nozzle 612.

In the Examples depicted in FIGS. 1-12, the ejection nozzle(s) directed towards the inlet portion of the combustor, and the inlet(s) of propellant-air mixing system are configured to receive and provide air flow in the direction of inlet portion of the combustor, in order to generate thrust in the direction of the motion of the vehicle.

Figure 13:
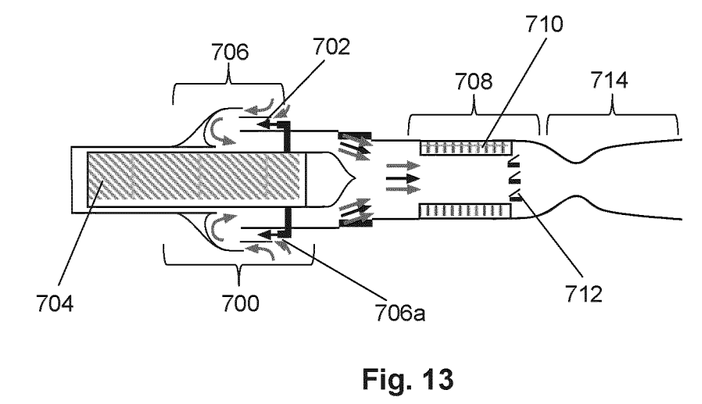
FIG. 13 is a schematic depiction of a multi-mode propulsion system in accordance with another embodiment of the present invention.

FIG. 13 schematically illustrates an example of the multimode propulsion system of the present invention in landing mode, wherein the direction of the ejection nozzle 702 is reversed, and the inlet end 706a of the propellant-air mixing system 706 is configured to provide initial airflow in the opposite direction with respect to the inlet portion of the combustor 708 provided with solid fuel 710 and flame holder 712, and in fluidic communication with exhaust nozzle 714. In this mode, in addition to providing the retro propulsion required for landing, the ejector system inlets provide extra drag for landing. The placement of the propellant-air mixing system at the top of the rocket provides aerodynamic stability. Each of the separate ejector systems can be configured to operate at a different strength to change pressure on side of vehicle, thereby provide better control.

Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

We claim:

1. A multimode propulsion system, comprising:
    at least one propellant ejector system for ejecting a first propellant, each comprising:
        a high speed fluid ejection nozzle coupled to a propellant supply, and
        a propellant-air mixing system comprising at least one fluid intake member having an inlet end and an outlet end, the inlet end being in fluidic communication with the fluid ejection nozzle to receive the first propellant ejected from the nozzle,
        the propellant-air mixing system being convertible between a closed position and an open position, wherein in the open position the inlet entrains air to be mixed with the propellant to form a propellant-air mixture and in the closed position the air entrainment is blocked,
        wherein the first propellant is an oxidizer and/or a fuel;
    wherein the at least one fluid intake member comprises a plurality of concentric fluid intake ducts, arranged in series, each intake duct having an inlet and an outlet, wherein the inlet of each intake duct has a cross sectional area greater than a cross sectional area of the outlet of a preceding intake duct, thereby providing an annular gap between adjacent intake ducts, and inlets of one or more of said intake ducts are convertible between an open and closed positions;
    at least one combustor positioned downstream of the at least one propellant ejector system for combusting a fuel, said combustor having an inlet portion in fluidic communication with the outlet end of the propellant-air mixing system for receiving the first propellant ejected by the propellant ejector system, and an outlet portion to exhaust combustion products, the combustor further being connected to an ignition source;
    optionally, at least one propellant injector positioned downstream of the propellant ejector system for injecting a second propellant into the combustor, wherein the second propellant is a fuel and/or an oxidizer; and
    an exhaust nozzle downstream of the outlet portion of the combustor,
    wherein the fuel for combustion in the combustor is a solid fuel provided in the combustor, a fuel injected from the at least one propellant injector, and/or a fuel ejected from the propellant ejector system.

2. The multimode propulsion system of claim 1, wherein the at least one fluid intake member further comprises one or more diffuser ducts positioned between the outlet of the fluid intake member and the inlet of the combustor.

3. The multimode propulsion system of claim 1, wherein one or more of said intake ducts have a varying cross-sectional area, and/or wherein the walls of the at least one intake duct has an airfoil or aerofoil type cross-sectional shape.

4. The multimode propulsion system of claim 1, wherein ejection nozzle is configured to eject the first propellant at a supersonic speed.

5. The multimode propulsion system of claim 1, further configured for heating said first propellant prior to ejection from the ejection nozzle, wherein the system is optionally configured to receive heat from the combustor and/or exhaust nozzle via a respective heat exchanger for heating the first propellant.

6. The multimode propulsion system of claim 5, wherein the first propellant is the oxidizer.

7. The multimode propulsion system of claim 1, wherein the system comprises two or more propellant ejector systems in fluidic communication with each of said at least one single combustor, or the system comprises two or more propellant ejector systems and two or more combustors, wherein each of the propellant ejector systems is in fluidic communication with a respective combustor.

8. The multimode propulsion system of claim 1, wherein said system is integrated into the body of a vehicle, or the system is a modular system configured to be incorporated in a vehicle.

9. The multimode propulsion system of claim 8, wherein the vehicle is an aerospace vehicle.

10. The multimode propulsion system of claim 8, wherein the system is configured to generate thrust in the direction of vehicle motion or in the opposite direction of vehicle motion.

11. A method of achieving one or more of the following modes using the propulsion system as defined in claim 1, the method comprising:
    (i) achieving a first rocket mode by ejecting an oxidizer via the propellant ejector system without air entrainment into the combustor, and generating thrust by combusting the ejected oxidizer in the presence of a solid fuel provided in the combustor and/or a fuel injected by the propellant injector, and optionally augmenting the ejected oxidizer by injecting additional oxidizer and/or a fuel;
    (ii) achieving a second rocket mode by ejecting a fuel via the propellant ejector system without air entrainment into the combustor, and generating thrust by combusting the ejected fuel in the presence of an oxidizer injected by the propellant injector, and optionally augmenting the ejected fuel by injecting an oxidizer and/or additional fuel;

(iii) achieving a first ramjet mode by ejecting fuel while entraining air via the propellant ejector systems to form a fuel-air mixture upstream of the combustor, and generating thrust by combusting the fuel-air mixture in the combustor, and optionally augmenting the fuel-air mixture by injecting additional fuel and/or an oxidizer; and (iv) achieving a second ramjet mode by ejecting an oxidizer while entraining air via the propellant ejector systems to form a oxidizer-air mixture upstream of the combustor, and generating thrust by combusting the oxidizer-air mixture in the presence of a fuel injected by the propellant injector and/or in the presence of a solid fuel provided in the combustor, and optionally augmenting the oxidizer-air mixture by injecting an oxidizer and/or additional fuel.

12. The method of claim 11, wherein the method comprises achieving at least one of the rocket modes (i) and (ii) in combination with the ramjet modes (iii) and/or (iv).

13. The method of claim 11, wherein the first rocket mode (i) is achieved by ejecting the oxidizer via the propellant ejector system without air entrainment into the combustor, and generating thrust by combusting the ejected oxidizer in the presence of the solid fuel provided in the combustor, and optionally augmenting the ejected oxidizer by injecting additional oxidizer and/or fuel.

14. The method of claim 11, wherein the second ramjet mode (iv) is achieved by ejecting the oxidizer while entraining air via the propellant ejector systems to form the oxidizer-air, and generating thrust by combusting the oxidizer-air mixture in the presence of the solid fuel provided in the combustor, and optionally augmenting the ejected oxidizer by injecting additional oxidizer and/or fuel.

15. The method of claim 11, wherein achieving the second ramjet mode (iv) comprises ejecting the oxidizer as primary propellant through the primary ejector system while entraining air to form the oxidizer-air mixture and injecting the fuel as secondary propellant to form an augmented oxidizer-air-fuel mixture, and combusting the augmented oxidizer-air-fuel mixture in the combustor to generate the thrust.

16. The method of claim 11, wherein achieving the first ramjet mode (iii) comprises ejecting the fuel as primary propellant through the primary ejector system while entraining air to form the fuel-air mixture, and injecting the additional fuel as secondary propellant to form an augmented fuel-air mixture, and combusting the augmented fuel-air mixture in the combustor to generate the thrust.

17. The method of claim 11, wherein achieving the first ramjet mode (iii) comprises ejecting the fuel as primary propellant through the primary ejector system while entraining air to form the fuel-air mixture and injecting the oxidizer as secondary propellant to form an augmented fuel-air-oxidizer mixture, and combusting the augmented fuel-air-oxidizer mixture in the combustor to generate the thrust.

18. The method of claim 11, which comprises achieving the first rocket mode (i) and the second ramjet mode (iv) or achieving the second rocket mode (ii) and the first ramjet mode (iii).

19. The method of claim 11, wherein the method comprises ejecting the oxidizer and/or the fuel at a supersonic speed.

20. The method of claim 11, wherein the method further comprises preheating the oxidizer and ejecting the preheated oxidizer to achieve the first rocket mode, third rocket mode and/or the second ramjet mode, wherein the preheating is optionally achieved by heat obtained from the combustor and/or exhaust nozzle via a respective heat exchanger.

* * * * *